Sept. 10, 1935.        J. J. PUNKE        2,014,030
VEHICLE BODY CONSTRUCTION
Filed Nov. 20, 1933        2 Sheets-Sheet 1
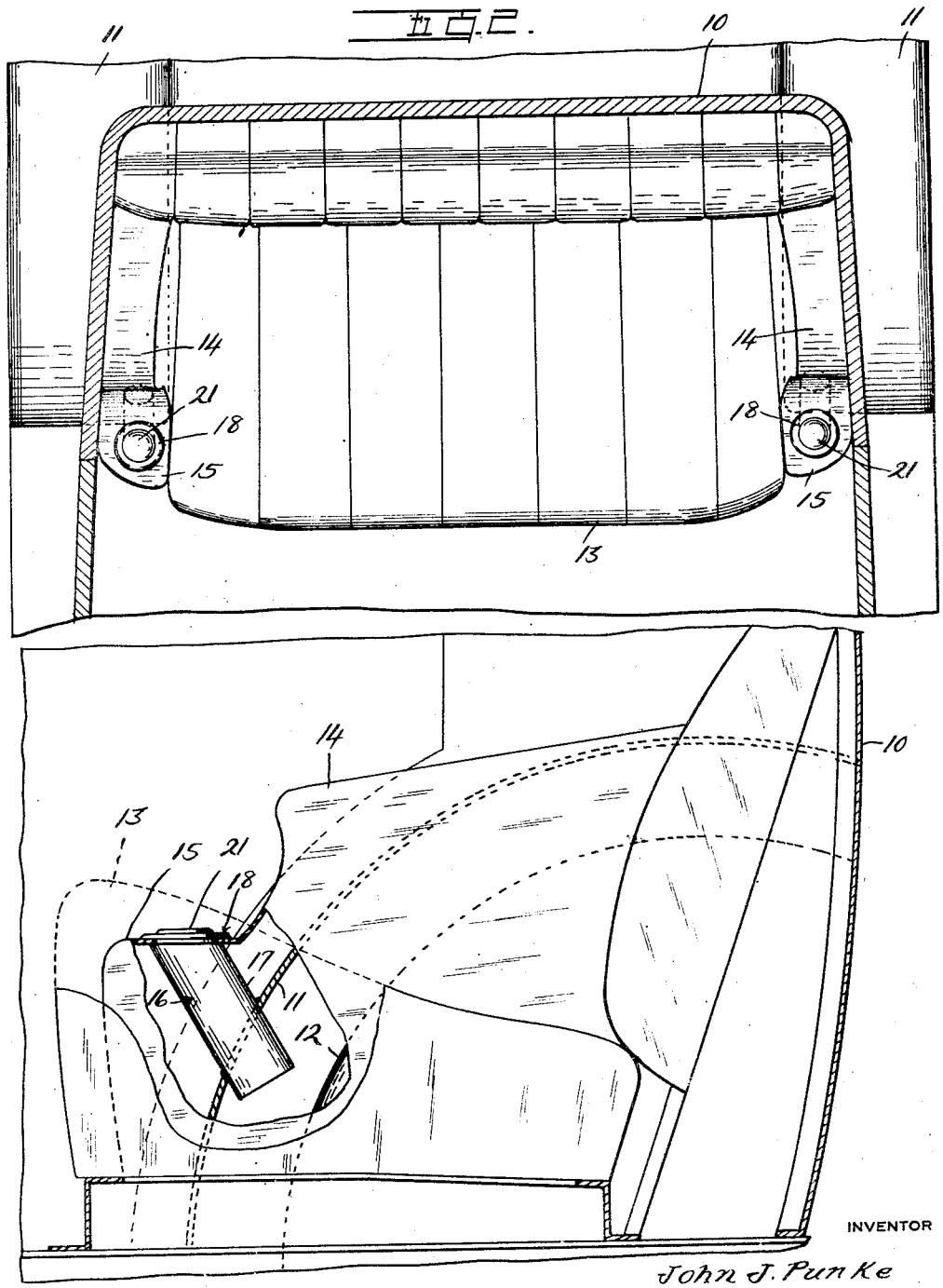
INVENTOR
John J. Punke Sept. 10, 1935.   J. J. PUNKE   2,014,030
VEHICLE BODY CONSTRUCTION
Filed Nov. 20, 1933   2 Sheets-Sheet 2
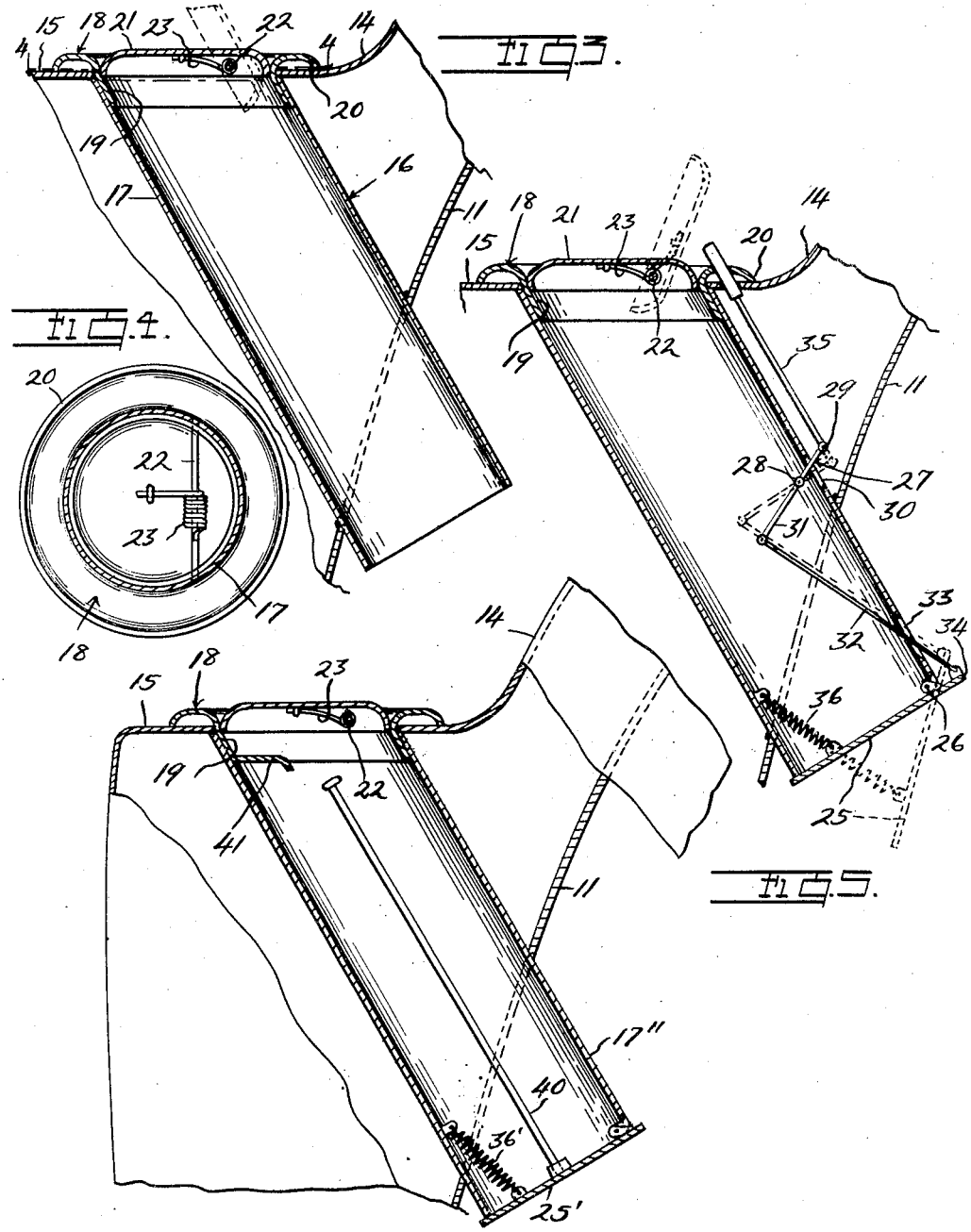
INVENTOR
John J. Punke
BY
ATTORNEYS Patented Sept. 10, 1935

2,014,030

UNITED STATES PATENT OFFICE 2,014,030

VEHICLE BODY CONSTRUCTION

John J. Punke, Detroit, Mich., assignor to Hupp Motor Car Corporation, Detroit, Mich., a corporation of Virginia Application November 20, 1933, Serial No. 698,914

2 Claims. (Cl. 206—19.5)

This invention relates generally to motor vehicles and refers more particularly to improvements in bodies for motor vehicles.

More specifically, this invention contemplates an improved refuse or ash dispenser adapted to be built into the body in a position convenient to the occupants of the body. In accordance with this invention the receptacle may be built into the arm rests commonly associated with the body seats, in such a manner that the receptacle proper is substantially concealed from view and does not protrude into the interior of the body. This arrangement not only provides for imparting a tailored appearance to the interior of the body without sacrificing the convenience afforded by accessories, such a ash dispensers, but at the same time offers the possibility of reducing the cost of manufacture since it renders it unnecessary to carefully design, or finish the dispenser proper.

Another novel feature of this invention resides in the provision of an arrangement whereby the ash dispenser is self cleaning, rendering it impossible for the ashes to blow out of the dispenser onto the upholstery of the body as is often the case when the ashes are stored in receptacles of the type now commercially installed in vehicle bodies.

A further feature of this invention resides in the provision of a construction wherein the dispenser is located at one side of the rear seat cushion and wherein the discharge end of the dispenser extends through the associated wheel housing to a point in advance of the rear wheel. The discharge end of the dispenser is located in a low pressure area affected by the forward motion of the vehicle and rotation of the rear wheel in the housing with the result that the slight vacuum existing in this area, not only assists the action of gravity in cleaning the dispenser, but also prevents foreign matter from entering the dispenser through the discharge end thereof.

A further object of this invention resides in the provision of ash dispensers, of the type specified above, in the arm rests at opposite sides of the rear seat cushion and also in the provision of closures for the receiving ends of the dispensers, so designed as to permit the same to be readily manipulated by the occupants of the aforesaid seat.

In addition to the foregoing, the present invention contemplates a dispenser of the type previously set forth having a closure for the discharge end thereof and having means for manipulating said closure from a position on the rear seat in the body.

The foregoing as well as other objects will be made more apparent as this description proceeds, especially when considered in connection with the accompanying drawings wherein:

Figure 1 is a semi-diagrammatical side elevational view of a portion of a vehicle body and featuring the ash dispenser forming the subject matter of this invention;

Figure 2 is a top plan view of the rear body seat shown in Figure 1;

Figure 3 is a sectional view of the dispensing device shown in Figure 1;

Figure 4 is a sectional view taken on the line 4—4 of Figure 3;

Figure 5 is a view similar to Figure 1 showing a slightly modified form of construction;

Figure 6 is a view similar to Figure 3 showing another embodiment of this invention.

Referring now to the drawings, it will be noted that there is fragmentarily illustrated in Figure 1, a portion of the rear end of a vehicle having a body 10 provided with a housing 11 on each side thereof for receiving the rear wheels 12 of the vehicle. Located within the body between the opposite side panels thereof is a passenger seat 13 having arm rests 14 at opposite ends thereof. The arm rests 14 assume positions over the wheel housings 11 and the forward portions 15 of the arm rests are offset downwardly to assume positions substantially flush with the top of the rear seat cushion when loaded.

The forwardly or downwardly offset portions 15 of the arm rests are apertured to receive the dispensing devices 16 forming the subject matter of this invention and since both of the dispensing devices are identical in construction, only one will be described herein. As shown in Figure 3 the dispensing device 16 comprises a chute 17 in the form of a tube insertable into the opening in the forward portion 15 of the arm rest 14 and extending downwardly through the arm rest into the wheel housing 11 as shown in Figure 1 of the drawings. In other words, the discharge end of the tube 17 extends exteriorly of the body and in the present instance the latter end is so located with reference to the wheel that the rotation of the same cooperates with the forward motion of the vehicle in developing a slight vacuum in the locality adjacent the discharge end of the tube. The low pressure area surrounding the discharge end of the tube not only assists the action of gravity in cleaning the tube but also prevents foreign matter from passing into the tube through the discharge end thereof. Moreover, the fact that the discharge opening is arranged in a plane extending opposite the direction of rotation of the wheels materially reduces the liability of foreign matter escaping into the tube through the discharge end.

The upper or receiving end of the tube 17 has secured thereto a suitable escutcheon 18 in the form of a collar having a tubular portion 19 sleeved within the upper end of the tube and having an outwardly projecting annular finishing flange 20 extending over the portion of the upholstery surrounding the opening through the arm rest for receiving the tube. For practical purposes the receiving end of the tube 17 is normally closed by a suitable closure 21 located within the escutcheon 18 and pivotally supported on the latter by means of a pin 22 located, in the manner shown in Figure 3, to permit the closure to be swung to its open position by merely exerting a slight pressure on one side thereof. In the present instance the closure is normally urged to its operative position with respect to the tube by means of a suitable spring 23 coiled around the pivot 22 and having one end portion anchored to the closure. Due to the relatively light weight of the closure, little force is required to return the same to its closed position and, as a consequence the spring may be relatively small so as not to appreciably counteract opening of the closure by the user.

With the construction as thus far described, it will be seen that the dispensing device is self-cleaning and furthermore is built into the body in such a manner as to be substantially concealed from view. As pointed out above, this latter feature is desirable since it does not require imparting a pleasing appearance to the construction and thereby renders it possible to manufacture the same for a nominal cost. Moreover, the dispensing device previously described eliminates any tendency for the ashes to blow out of the same onto the upholstery of the body.

The modified form of the invention illustrated in Figures 4 and 5 differs from the one previously described in that a closure 25 is provided at the discharge end of the tube 17 as well as at the receiving end of this tube. The closure 25 is suitably pivotally connected to the bottom of the tube as at 26 for outward swinging movement relative to the discharge end of the tube, and any suitable means may be employed for actuating the closure from a position within the vehicle body. One method which may be used for operating the closure is shown in the drawings and comprises a rock arm 27 pivotally supported intermediate the ends thereof as at 28 within the tube and having one end 29 projecting through an elongated slot 30 in the side of the tube. The opposite end 31 of the arm is operatively connected to the closure 25 for opening the latter upon upward swinging movement of the end 31 of the arm. The aforesaid connection in the present instance comprises a link 32 pivotally connected at its upper end to the end 31 of the rock arm and extending through an elongated slot 33 in the side of the tube for connection with the closure. As shown particularly in Figure 5, the closure is provided with an ear 34 extending upwardly beyond the pivot 26 for connection with the lower end of the link 32. With the construction thus far described, it will be seen that downward movement of the end 29 of the arm 27 effects an upward movement of the end 31 of this arm and, through the link 32, causes the closure 25 to swing to its open position. In this connection it is to be noted that the end 31 of the rock arm is of considerable greater length than the end 29 so that for a relatively short travel of the end 29 the closure will be opened to a comparatively greater extent, sufficient to permit the refuse in the tube to be discharged. In order to impart the desired rocking movement to the end 29 of the rock arm from a convenient position in the body, I provide a plunger 35 having the lower end pivotally connected to the end 29 of the rock arm and having the upper end slidably supported within the escutcheon 20. The upper end of the plunger projects above the escutcheon 20 so as to be readily engaged by the user and this plunger is normally maintained in its uppermost position, wherein the closure 25 is closed, by means of a suitable spring 36 connected in the assembly in the manner clearly shown in the drawings.

The modified form of the invention previously described may also be considered as self-cleaning since the cleaning operation is effected by merely depressing the plunger 35.

In addition to the advantages previously described in connection with the first described form of the invention, this modification possesses the further feature of actually preventing lighted cigarettes, cigars and the like from passing directly out of the body. Although this is not a serious objection of the first described embodiment since the refuse is deposited on the road proper instead of in the brush at the sides of the road, nevertheless the closure type dispenser may be more desirable in highly wooded localities.

In view of the fact that the plunger 35 for actuating the closure 25 in the preceding modification may be considered too accessible for the purpose of preventing lighted cigarettes and the like from being discharged from the vehicle it may be desirable to locate the actuating means for the closure in a relatively inaccessible position and thereby prevent promiscuous operation of the closure. For accomplishing this result, I resort to the construction shown in Figure 6 wherein closure 25' is normally urged in its closed position by means of a spring 36' and wherein the closure is positively opened by a rod 40 located within the tube 17'', and secured at its lower end to the inner surface of the closure 25 substantially centrally of the latter. The upper end of the rod terminates at a point substantially below the receiving end of the tube, requiring the finger of the operator to be inserted within the tube for actuating the rod to open the closure. This construction would eliminate promiscuous cleaning of the dispensing device and at the same time provides for actuating the closure from a position within the body. Also, in connection with this modification, I have shown in Figure 6 means for snuffing cigarettes and the like before actually dropping the same into the tube. In the specific embodiment of the invention the foregoing means is shown as comprising a flange 41 located within the tube adjacent the upper end thereof and secured to the tubular portion 19 of the escutcheon 18.

Although in describing the present invention reference has been made to only three specific embodiments, nevertheless, it should be understood that the advantageous features of this invention may be realized by various different constructions, and reservation is made to make such changes in the construction as may come within the purview of the accompanying claims.

What I claim as my invention is:

1. In a motor vehicle, the combination with a body, of a dispensing device comprising a tube having the receiving end conveniently positioned within the body and extending downwardly through a portion of the body to a point exteriorly of the latter, a closure for the discharge end of the tube, means located within the tube for actuating said closure, and a closure for the receiving end of the tube concealing said actuating means.

2. In a motor vehicle, the combination with a body, of a dispensing device comprising a tube for the receiving end conveniently positioned within the body and extending downwardly through a portion of the body to a point exteriorly of the latter, a closure for the discharge end of the tube, means for actuating said closure from a point within the body, a snuffing device located within the tube adjacent the receiving end and a closure for the receiving end of the tube concealing said snuffing device.

JOHN J. PUNKE.